US012691403B2

(12) United States Patent
Kuppan et al.

(10) Patent No.: US 12,691,403 B2
(45) Date of Patent: Jul. 28, 2026

(54) SYSTEMS AND METHODS OF ABATING HYDROGEN SULFIDE GAS

(71) Applicant: Rivian IP Holdings, LLC, Plymouth, MI (US)

(72) Inventors: Saravanan Kuppan, San Jose, CA (US); Rubayyat Mahbub, Fremont, CA (US); Soo Kim, Fremont, CA (US); Rajeev Dhiman, Pleasanton, CA (US); Asma Sharafi, Ann Arbor, MI (US); Forrest Gittleson, Mountain View, CA (US); Chen Chen, Marana, AZ (US); Sonika Rajput, Beavercreek, OH (US)

(73) Assignee: Rivian IP Holdings, LLC, Irvine, CA (US)

( * ) Notice: Subject to any disclaimer, the term of this patent is extended or adjusted under 35 U.S.C. 154(b) by 607 days.

(21) Appl. No.: 17/878,327

(22) Filed: Aug. 1, 2022

(65) Prior Publication Data

US 2024/0033677 A1     Feb. 1, 2024

(51) Int. Cl.
B01D 53/04     (2006.01)
B01D 53/14     (2006.01)
(Continued)

(52) U.S. Cl.
CPC ..... B01D 53/0415 (2013.01); B01D 53/0446 (2013.01); B01D 53/1468 (2013.01); B01D 53/1493 (2013.01); B01D 53/18 (2013.01); B60L 50/64 (2019.02); H01M 4/38 (2013.01); H01M 10/0562 (2013.01); H01M 50/209 (2021.01); H01M 50/211 (2021.01); H01M 50/213 (2021.01); H01M 50/249 (2021.01);
(Continued)

(58) Field of Classification Search
CPC ............ B01D 53/1468; B01D 53/0415; B01D 2257/304; B01D 2253/112; B01D 2258/02; B60L 50/64; H01M 2220/20; H01M 10/52; H01M 50/249; H01M 50/489; B01J 20/045; B01J 2220/42
See application file for complete search history.

(56) References Cited

U.S. PATENT DOCUMENTS

2017/0260095 A1     9/2017   Song et al.
2019/0198948 A1 *   6/2019   Iwamoto ............... H01M 10/52
(Continued)

FOREIGN PATENT DOCUMENTS

CN     107305947 A  *  10/2017  ........ H01M 10/0525
JP     2020202103 A  *  12/2020

OTHER PUBLICATIONS

Haider, J. et al. Simultaneous capture of acid gases from natural gas adopting ionic liquids: Challenges, recent developments, and prospects Renewable and Sustainable Energy Reviews, vol. 123, No. 109771 (May 2020). (Year: 2020).*
(Continued)

*Primary Examiner* — Jennifer Dieterle
*Assistant Examiner* — Rachel Marie Slaugovsky
(74) *Attorney, Agent, or Firm* — Foley & Lardner LLP

(57)     ABSTRACT

Provided herein is an apparatus. The apparatus can include a sorbent to dispose in an electric vehicle. The electric vehicle can include a battery cell. The sorbent can be configured to remove hydrogen sulfide gas from the electric vehicle. The hydrogen sulfide gas can be generated by a component of the battery cell.

20 Claims, 14 Drawing Sheets

(51) Int. Cl.

| | |
|---|---|
| *B01D 53/18* | (2006.01) |
| *B60L 50/64* | (2019.01) |
| *H01M 4/38* | (2006.01) |
| *H01M 10/0562* | (2010.01) |
| *H01M 50/209* | (2021.01) |
| *H01M 50/211* | (2021.01) |
| *H01M 50/213* | (2021.01) |
| *H01M 50/249* | (2021.01) |
| *H01M 4/02* | (2006.01) |

(52) U.S. Cl.
CPC .... *B01D 2252/10* (2013.01); *B01D 2253/104* (2013.01); *B01D 2253/1122* (2013.01); *B01D 2253/1124* (2013.01); *B01D 2257/304* (2013.01); *B01D 2259/4566* (2013.01); *H01M 2004/028* (2013.01); *H01M 2220/20* (2013.01); *H01M 2300/0068* (2013.01)

(56) References Cited

U.S. PATENT DOCUMENTS

| | | | | |
|---|---|---|---|---|
| 2023/0066390 A1* | 3/2023 | Sharafi | .................. | H01M 10/48 |
| 2023/0318062 A1* | 10/2023 | Taniuchi | .......... | H01M 10/6561 |
| | | | | 429/120 |
| 2024/0186603 A1* | 6/2024 | Okano | ................. | B01J 20/0237 |
| 2024/0347872 A1* | 10/2024 | Myers | ................. | H01M 50/264 |
| 2024/0413418 A1* | 12/2024 | Murata | .............. | H01M 50/141 |

OTHER PUBLICATIONS

Haider, J. et al. (Year: 2020).*

Gasper-Galvin, L. D. et al. (1998). Zeolite-Supported Metal Oxide Sorbents for Hot-Gas Desulfurization. Industrial & Engineering Chemistry Research, vol. 37 (10), pp. 4157-4166 (hereinafter referred to as Gasper-Galvin). (Year: 1998).*

Reshentenko, T. V. et al. (2002) Study of the reaction of high-temperature H2S decomposition on metal oxides ($\gamma$-Al2O3, $\alpha$-Fe2O3, V2O5). International Journal of Hydrogen Energy, vol. 27 (4), pp. 387-394 (Year: 2002).*

Haider, Junaid et al. (2020). Simultaneous capture of acid gases from natural gas adopting ionic liquids: Challenges, recent developments, and prospects. Renewable and Sustainable Energy Reviews, vol. 123, Article 109771 (Year: 2020).*

Gasper-Galvin, L. D. et al. (1998). Zeolite-Supported Metal Oxide Sorbents for Hot-Gas Desulfurization. Industrial & Engineering Chemistry Research, vol. 37 (10), pp. 4157-4166 (Year: 1998).*

* cited by examiner

| Tier-1 binary oxides | $M_xO_y$ where M=Mo, W, Bi, Co, Ba, Ti, V or Sb |
| Tier-2 ternary oxides | $M_xN_yO_z$ where N=Fe or Mo and M=Na, K, Fe, La, Mo, Bi, Sr, Al or Cr |

SYSTEMS AND METHODS OF ABATING HYDROGEN SULFIDE GAS

INTRODUCTION

Batteries can have different power capacities to charge and discharge power to operate machines.

SUMMARY

Hydrogen sulfide gas can be produced by batteries. For example, structural units of a sulfide electrolyte in a battery can react with water vapor or humidity in air to produce hydrogen sulfide gas. The solutions described herein can abate hydrogen sulfide gas by providing a sorbent that removes hydrogen sulfide gas generated by a battery component.

At least one aspect is directed to an apparatus. The apparatus can include a sorbent to dispose in an electric vehicle including a battery cell. The sorbent can remove hydrogen sulfide gas from the electric vehicle. The hydrogen sulfide gas can be generated from a component of the battery cell.

At least one aspect is directed to a method. The method can include providing a sorbent. The method can include disposing the sorbent in an electric vehicle including a battery cell. The method can include removing, by the sorbent, hydrogen sulfide gas from the electric vehicle. The hydrogen sulfide gas can be generated from a component of the battery cell.

At least one aspect is directed to a method. The method can include dividing a set of candidate compounds into a first set of compounds and a second set of compounds. The first set of compounds can include one or more elements that are at least one of radioactive, having an abundance below an abundance threshold, or having a parameter above a parameter threshold. The second set of compounds can include a remainder of the set of candidate compounds. The method can include selecting a third set of compounds from the second set of compounds. The third set of compounds can include compounds that have thermodynamic stability above a stability threshold. The method can include selecting a fourth set of compounds from the third set of compounds. The fourth set of compounds can include compounds that have reactivity with hydrogen sulfide gas above a reactivity threshold.

At least one aspect is directed to an electric vehicle. The electric vehicle can include a battery cell. The electric vehicle can include a sorbent configured to remove hydrogen sulfide gas from the electric vehicle. The hydrogen sulfide gas can be generated from a component of the battery cell.

At least one aspect is directed to a battery. The battery can include a cover plate. The battery can include a sorbent disposed on the cover plate. The sorbent can remove hydrogen sulfide gas from an electric vehicle. The hydrogen sulfide gas can be produced by the electric vehicle.

At least one aspect is directed to a system. The system can include a battery pack frame. The system can include a sorbent disposed on the battery pack frame. The sorbent can remove hydrogen sulfide gas from an electric vehicle. The hydrogen sulfide gas can be produced by the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of abating hydrogen sulfide ($H_2S$) gas or $H_2S$. The various concepts introduced above and discussed in greater detail below may be implemented in any of numerous ways.

The present disclosure is directed to systems and methods of abating $H_2S$ gas, for example, produced by solid-state batteries (e.g., all-solid-state batteries). Solid-state batteries that include a sulfide solid electrolyte can produce $H_2S$ gas, for example, when structural units of the sulfide electrolyte react with air (e.g., water vapor or humidity in air).

To abate $H_2S$ gas produced by sulfide solid electrolytes, the technical solutions can provide a sorbent that removes $H_2S$ gas from an electric vehicle by capturing or reacting with $H_2S$ gas. The sorbent can remove $H_2S$ gas produced from a battery that includes a sulfide-based solid electrolyte. The $H_2S$ gas can be generated by a reaction between water in the air and compounds in the battery. The sorbent can coat a vehicle component (e.g., cross member, battery pack frame, battery pack, battery pack cover plate, etc.). The sorbent can be disposed in a cartridge that receives the hydrogen sulfide gas. The cartridge can include an inlet and a fan fluidly coupled with the inlet. The fan can flow the $H_2S$ gas to the sorbent. The sorbent can be selected by down selecting a material that satisfies a set of conditions. This technical solution can abate $H_2S$ gas produced by solid-state batteries.

Figure 1:
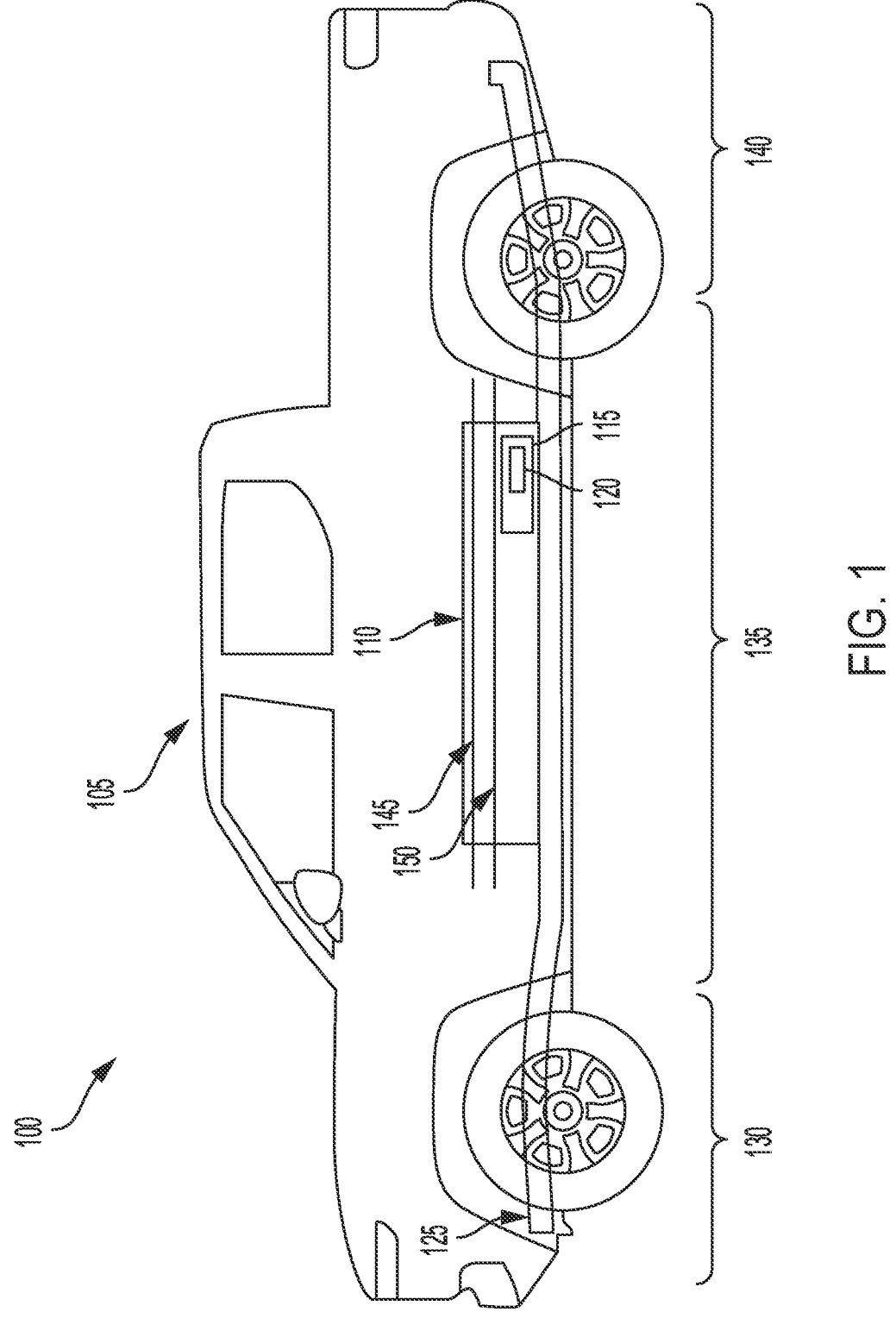
FIG. 1 depicts a cross-sectional view of an electric vehicle, according to an example implementation.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 (e.g., secondary battery) to power the electric vehicles 105. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar (e.g., a current collector element). For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
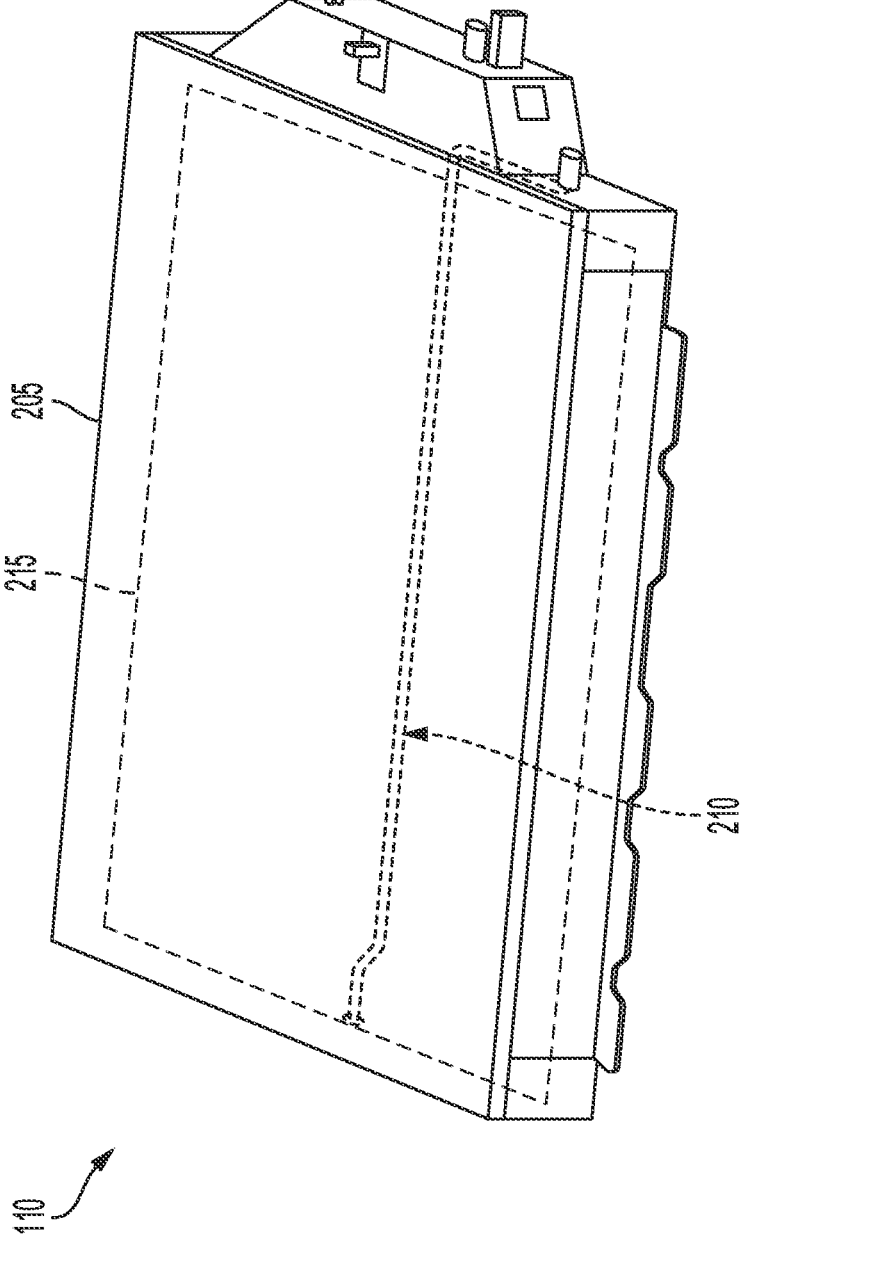
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205 (e.g., battery module housing). The housing 205 can include at least one battery module 115 or at least one battery cell 120, as well as other battery pack components. The housing 205 can include a shield on the bottom and/or underneath the battery module 115 and/or cells 120 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. In some instances, the thermal component 215 may be positioned in relation to a top submodule and a bottom submodule, such as in between the top and bottom submodules, among other possibilities. As such, the thermal component 215 may be a fraction of the size depicted in FIG. 2A, such that there are multiple thermal components 215 for each top and bottom submodule pair. The cooling line 210 can be coupled with, part of, or independent from the thermal component 215.

Figure 2B:
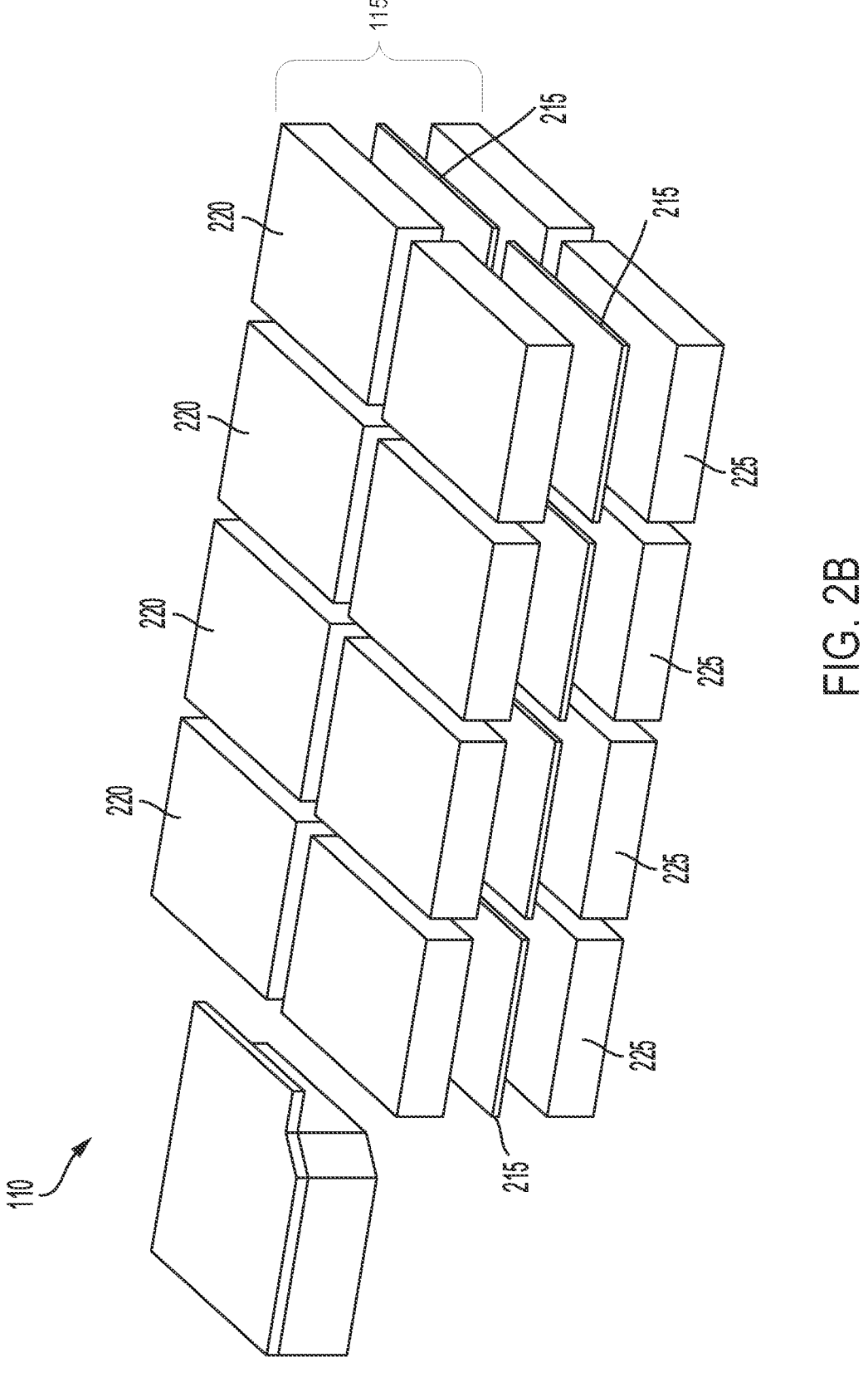
FIG. 2B depicts a battery module, according to an example implementation.
Figure 2C:
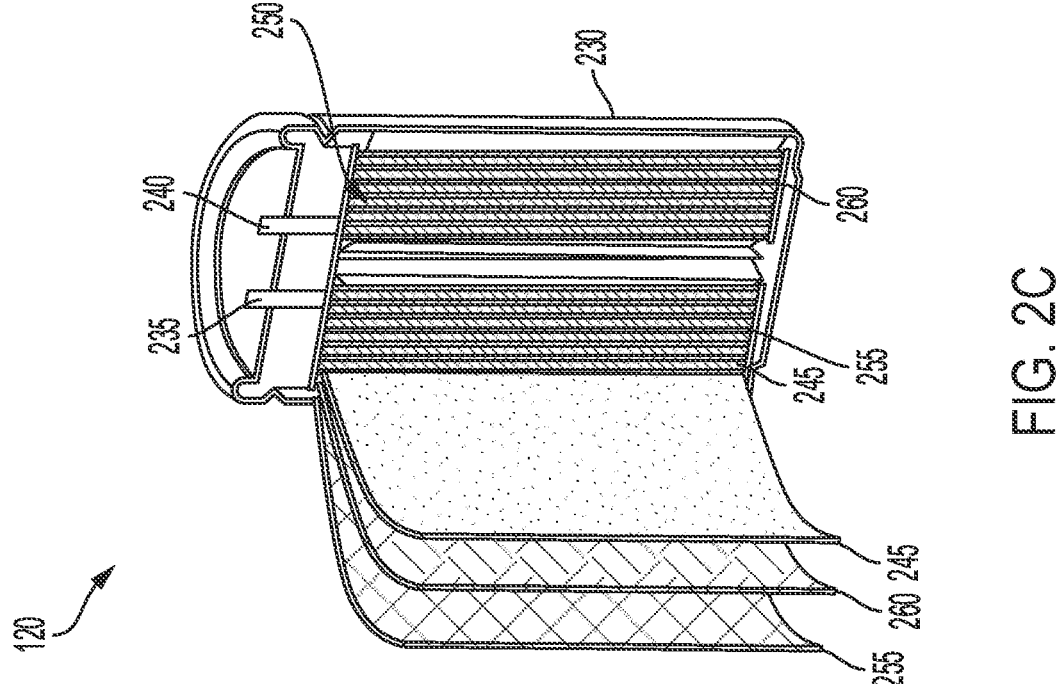
FIG. 2C depicts a cross-sectional view of a battery cell, according to an example implementation.
Figure 2D:
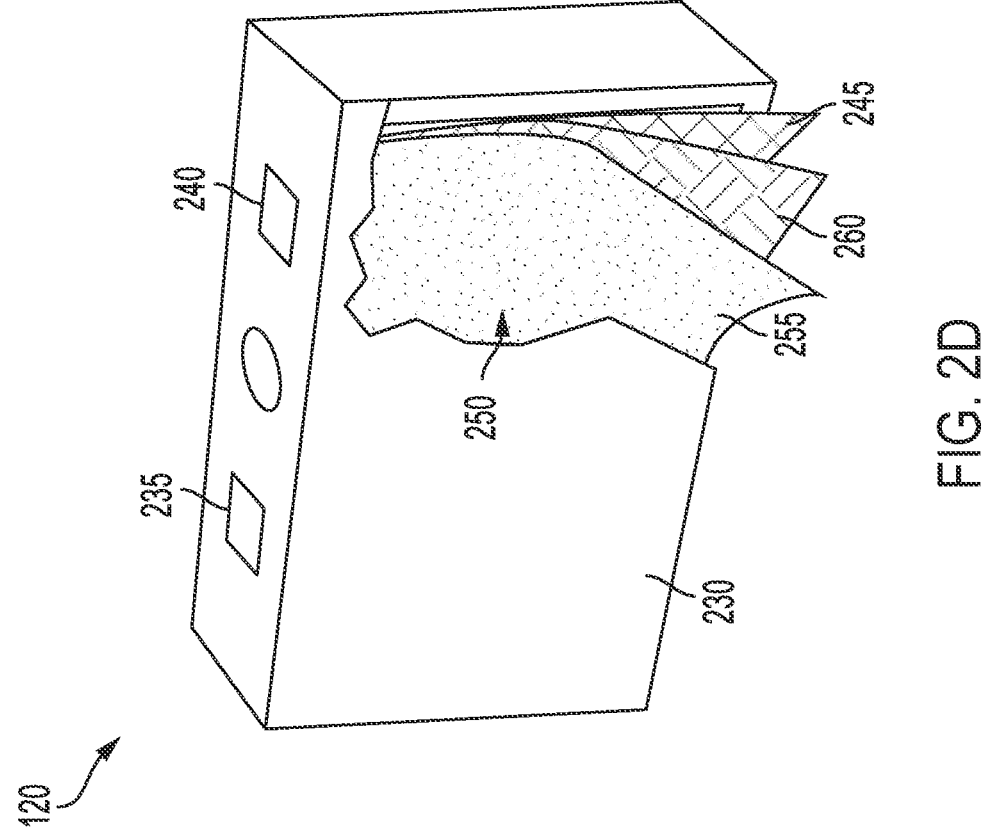
FIG. 2D depicts a cross sectional view of a battery cell, according to an example implementation.
Figure 2E:
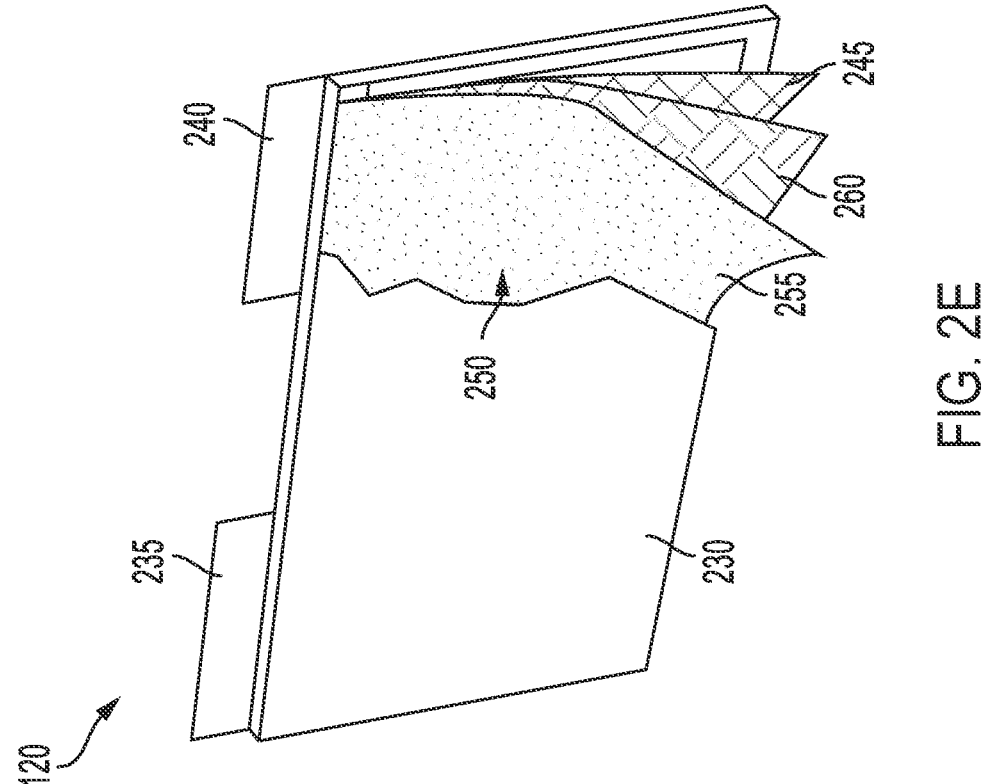
FIG. 2E depicts a cross sectional view of a battery cell, according to an example implementation.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack 110 can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. In some embodiments, the battery pack 110 may not include a battery module 115. For example, the battery pack 110 can have a cell-to-pack configuration in which battery cells 120 are arranged directly into a battery pack 110 without assembly into a battery module 115. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated, or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions to store or provide electric power for the battery cell 120 by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell 120. For example, the battery cell anode can include lithium, graphite, silicon, a lithium alloy (e.g., Li—Mg, Li—Al, Li—Ag, etc.), or a composite (e.g., lithium and carbon, silicon and carbon, etc.) and the battery cell cathode can include a lithium-based oxide material, sulfur, a sulfide (e.g., iron sulfide, metal sulfide), a fluoride (e.g., copper fluoride), or lithium iron phosphate. The electrolyte material can be disposed in the battery cell 120 to separate the anode and cathode from each other and to facilitate transfer of lithium ions between the anode and cathode. It should be noted that battery cell 120 can also take the form of a solid-state battery cell developed using solid electrodes and solid electrolytes. Solid electrodes or electrolytes can be or include organic polymeric-based electrolytes or inorganic electrolytes, for example phosphide-based, sulfide-based (e.g., crystalline $\beta$-$Li_3PS_4$, amorphous $\beta$-$Li_3PS_4$, $\alpha$-$(100\text{-x})Li_7 \cdot xP_3S_{11}$, $\beta$-$(100\text{-x})Li_7 \cdot xP_3S_{11}$, $\gamma$-$(100\text{-x})Li_7 \cdot xP_3S_{11}$, $Li_2S$—$P_2S_5$, $Li_6PS_5Cl$, $Li_6PS_5Br$, $Li_6PS_5I$, etc.), halide-based, oxide-based, ceramic, polymer, or glassy solid-state electrolytes, or any combination thereof. A ceramic electrolyte can include, for example, lithium phosphorous oxy-nitride ($Li_x$-$PO_yN_z$), lithium germanium phosphate sulfur ($Li_{10}GeP_2S_{12}$), yttria-stabilized zirconia (YSZ), NASICON ($Na_3Zr_2Si_2PO_{12}$), beta-alumina solid electrolyte (BASE), perovskite ceramics (e.g., strontium titanate ($SrTiO_3$)). A polymer electrolyte (e.g., a hybrid or pseudo-solid-state electrolyte) can include, for example, polyacrylonitrile (PAN), polyethylene oxide (PEO), polymethyl-methacrylate (PMMA), or polyvinylidene fluoride (PVDF). A glassy electrolyte can include, for example, lithium sulfide-phosphor pentasulfide ($Li_2S$—$P_2S_5$), lithium sulfide-boron sulfide ($Li_2S$—$B_2S_3$), or tin sulfide-phosphor pentasulfide ($SnS$—$P_2S_5$). The solid-state electrolytes can include thio-LISICON $Li_{11-x}M_{2-x}P_{1+x}S_{12}$ (e.g., M=Ge, Sn, or Si), $TLi_2S$—$P_2S_5$—LiI, $Li_4P_2S_7$—LiI, $Li_2S$-M (e.g., M=$SiS_2$, $GeS_2$, $P_2S_5$, $B_2S_3$, $As_2S_3$), $xLi_2S_{(1-x)}SiS_2$ (e.g, x≤0.6), $SiS_2$—$P_2S_5$—$Li_2S$—$Li_2S$—LiI, $Li_7P_2S_8I$, $Li_{3.25}Si_{0.25}P_{0.75}S_4$, $Li_7P_2S_8I$, $Li_{15}(PS_4)_4Cl_3$, $Li_{14.8}Mg_{0.1}$ $(PS_4)_4Cl_3$, $Li_{10}SiP_2S_{11.3}O_{0.7}$, $Li_{9.4}Si_{1.02}P_{2.1}S_{9.96}O_{2.04}$, $Li_{9.54}Si_{1.74}P_{1.44}Si_{11.7}Cl_{0.3}$, $Li_{11}AlP_2S_{12}$, $30Li_2S$-$25B_2S_3$-$45LiI$-$xSiO_2$, or $Li_{1.05}B_{0.5}Si_xO_{2x}S_{1.05}I_{0.45}$ (0≤x≤1). Yet further, some battery cells 120 can be solid-state battery cells and other battery cells 120 can include liquid electrolytes for lithium-ion battery cells. The battery cell 120 can include a lithium sulfur (Li—S) battery.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules. For example, the battery pack can have a cell-to-pack configuration wherein battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions) from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an olivine phosphate ($LiMPO_4$, M=Fe and/or Co and/or Mn and/or Ni)) chemistry, LISICON or NASICON phosphates ($Li_3M_2$ ($PO_4)_3$ and $LiMPO_4O_x$, M=Ti, V, Mn, Cr, and Zr), layered oxides ($LiMO_2$, M=Ni and/or Co and/or Mn and/or Fe and/or Al and/or Mg), nickel manganese cobalt (NMC) chemistries, nickel cobalt aluminum (NCA) chemistries, or lithium cobalt oxide (LCO) chemistries, lithium rich layer oxides (e.g., $Li_{1+x}M_{1-x}O_2$ (M=Ni, and/or Mn, and/or Co), (OLO or LMR), spinels ($LiMn_2O_4$) and high voltage spinels ($LiMn_{1.5}Ni_{0.5}O_4$), disordered rock salt, fluorophosphates $Li_2FePO_4F$ (M=Fe, Co, Ni), or fluorosulfates $LiMSO_4F$ (M=Co, Ni, Mn) for a cathode layer (e.g., the cathode layer 255). Lithium-ion batteries can include a graphite chemistry, a silicon-graphite chemistry, or a lithium metal chemistry for the anode layer (e.g., the anode layer 245). For example, a cathode layer having a lithium iron phosphate (LFP) chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include medium to high-nickel content (e.g., in a range of 50 wt % to 80 wt % Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include silicon, a LiIn alloy, or Li metal.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The electrolyte layer 260 can include a liquid organic electrolyte. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., $Li_3PS_4$, $Li_7P_3S_{11}$, $Li_2S-P_2S_5$, $Li_2S-B_2S_3$, $SnS-P_2S_5$, $Li_2S-SiS_2$, $Li_2S-P_2S_5$, $Li_2S-GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others. The solid-state electrolyte material can include thio-LISICON $Li_{11-x}M_{2-x}P_{1-x}S_{12}$ (e.g., M=Ge, Sn, or Si), $TLi_2S-P_2S_5-LiI$, $Li_4P_2S_7-LiI$, $Li_2S$-M (e.g., M=$SiS_2$, $GeS_2$, $P_2S_5$, $B_2S_3$, $As_2S_3$), $xLi_2S_{(1-x)}SiS_2$ (e.g, x≤0.6), $SiS_2-P_2S_5-Li_2S-Li_2S-LiI$, $Li_7P_2S_8I$, $Li_{3.25}Si_{0.25}P_{0.75}S_4$, $Li_7P_2S_8I$, $Li_{15}(PS_4)_4Cl_3$, $Li_{14.8}Mg_{0.1}(PS_4)_4Cl_3$, $Li_{10}SiP_2S_{11.3}O_{0.7}$, $Li_{9.4}-Si_{1.02}P_{2.1}S_{9.96}O_{2.04}$, $Li_{9.54}Si_{1.74}P_{1.44}S_{11.7}Cl_{0.3}$, $Li_{11}AlP_2S_{12}$, $30Li_2S-25B_2S_3-45LiI-xSiO_2$, or $Li_{1.05}B_{0.5}Si_xO_{2x}S_{1.05}I_{0.45}$ (0≤X≤1).

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
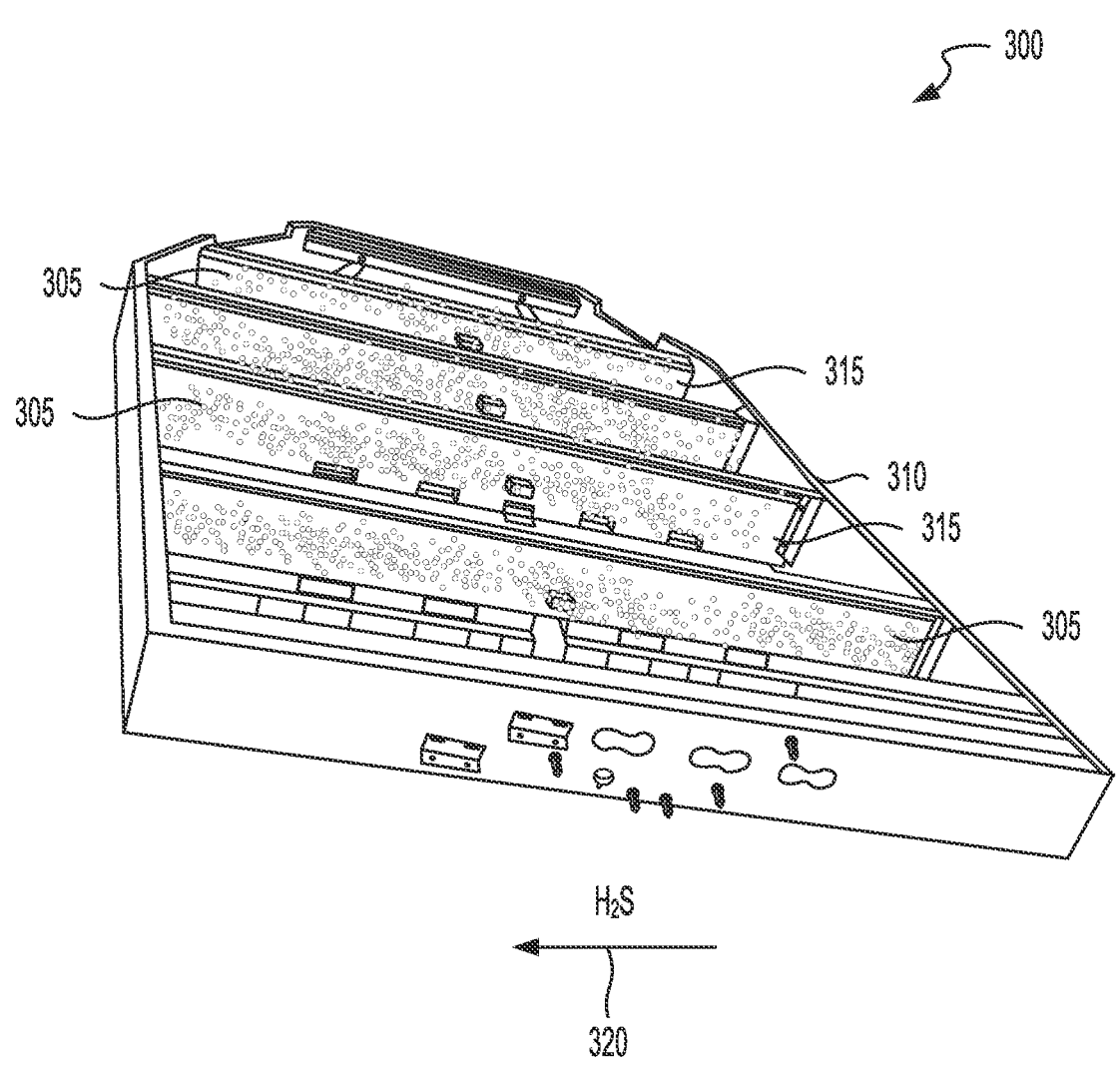
FIG. 3 depicts a perspective view of an apparatus, according to an example implementation.

FIG. 3 depicts a perspective view of an apparatus 300. The apparatus 300 can include at least one sorbent 305. The sorbent 305 can include a solid sorbent or a liquid sorbent. The sorbent 305 can have a variety of form factors, shapes, or sizes. The sorbent 305 can include a metal organic framework (MOF). The sorbent 305 can be disposed in the electric vehicle 105. The electric vehicle 105 can include at least one battery (e.g., battery cell 120, battery pack 110, battery module 115, etc.). For example, the battery can be disposed in the electric vehicle 105. The battery can include a sulfur-containing solid electrolyte (e.g., sulfide solid electrolyte, sulfide-based solid electrolyte), sulfur-containing cathode, or a combination thereof. For example, the battery can include a sulfide solid electrolyte. For example, the battery can include the sulfide solid electrolyte disposed in the electric vehicle 105. Sulfide solid electrolytes or sulfur-containing cathodes can have chemical instability in air. For example, the $PS_4^{3-}$ group can react with the humidity in the air (e.g., ambient humidity) and release corrosive $H_2S$ gas. The battery can include a sulfide-based solid electrolyte. For example, the battery can include the sulfide-based solid electrolyte disposed in the electric vehicle 105. The battery can include a sulfur-containing solid electrolyte. For example, the battery can include the sulfur-containing solid electrolyte disposed in the electric vehicle 105. The battery can include a lead acid battery with a liquid sulfuric acid electrolyte. The battery can include a sulfur-containing cathode. For example, the battery can include the sulfur-containing cathode disposed in the electric vehicle 105.

The sorbent 305 can remove hydrogen sulfide gas 320 (e.g., $H_2S$ gas) from the electric vehicle 105. For example, the sorbent 305 can react with the hydrogen sulfide gas 320 to consume the hydrogen sulfide gas 320. The sorbent 305 can remove the hydrogen sulfide gas 320 by chemically reacting with the hydrogen sulfide gas 320. The sorbent 305 can react with ambient humidity or water vapor in the air. The sorbent 305 can react with the hydrogen sulfide gas 320 to remove the hydrogen sulfide gas 320 from the electric vehicle 105. For example, the sorbent 305 can remove the hydrogen sulfide gas 320 from an area inside or surrounding the electric vehicle 105. The sorbent 305 can remove hydrogen sulfide gas 320 from the air. The hydrogen sulfide gas 320 can be removed by precipitation. For example, the hydrogen sulfide gas 320 can be removed by precipitation using a concentrated solution. The sorbent 305 can capture the hydrogen sulfide gas 320. For example, the sorbent 305 can absorb or adsorb the hydrogen sulfide gas 320. The sorbent 305 can remove hydrogen sulfide from the electric vehicle 105 by trapping the hydrogen sulfide gas 320 on in the bulk of the sorbent 305 or a surface of the sorbent 305. The hydrogen sulfide gas 320 can be released in the battery pack 110 if there is a mechanical failure or cell (e.g., battery cell 120) failure. For example, an improper seal can let moisture (e.g., $H_2O$, water, etc.) into the battery pack 110. Moisture can be trapped in the battery cell 120 from an undried component of the battery cell 120, which can lead to battery cell failure. Hydrogen sulfide gas 320 can corrode metal components in the battery pack 110. Hydrogen sulfide gas 320 can corrode structural members of the battery pack 110. The sorbent 305 can prevent the hydrogen sulfide gas 320 from entering the cabin of the electric vehicle 105.

The sorbent 305 can include at least one of a metal, a metal oxide, a chloride, or a sulfate. For example, the sorbent 305 can include at least one of $Mo_9O_{26}$, $W_{18}O_{49}$, $W_8O_{21}$, $B_{14}O_7$, $Co_3O_4$, $BaO_{10}$, $Ti_6O$, $V_5O_{12}$, $Sb_2O_5$, $Na_6Mo_{11}O_{36}$, $K_{14}Fe_4O_{13}$, $La_6Mo_8O_{33}$, $K_2Mo_4O_{13}$, $Fe_2(MoO_4)_3$, $Bi_{14}Mo_5O_{36}$, $K_{17}Fe_5O_{16}$, $Sr_8Fe_8O_{23}$, $Bi_2(MoO_4)_3$, $Al_2(MoO_4)_3$, or $Cr_2(MoO_4)_3$. The sorbent 305 can include a concentrated solution containing iron chloride or iron sulfate. The sorbent 305 can be used to remove the hydrogen sulfide gas 320 as FeS. The sorbent 305 can include at least one of $FeCl_2$, $FeCl_3$ or $FeSO_4$. The sorbent 305 can include porous inorganic materials. For example, the sorbent 305 can include porous inorganic materials with oxidative properties. The sorbent 305 can include metal nanoparticles. The sorbent 305 can include metal nanoparticles embedded on carbon. The sorbent 305 can include metal oxide nanoparticles. The sorbent 305 can include activated carbon. The sorbent 305 can include activated carbon impregnated with metal nanoparticles. The sorbent 305 can include biochar. The sorbent 305 can include biochar obtained from waste materials. The sorbent 305 can include a powder, pellet, solid, or liquid.

The sorbent 305 can include at least one active sorbent mixed with a thermoplastic polymer, a thermoset polymer, or a UV curable polymer. The sorbent 305 can be sprayed on at least one vehicle component (e.g., battery pack frame 310, battery pack cover plate, etc.) using an electrostatic gun or compressed air. In an example involving electrostatic coating, a gun can impart a negative charge to the mixture that includes the sorbent 305 and a polymer. The mixture can be sprayed towards the grounded battery pack frame 310 and/or on the battery pack cover plate by mechanical or compressed air. In another example, fluidized bed coating (e.g., electro-static) can be used to achieve the coating of sorbent 305 on the battery pack frame 310 and/or on the battery pack cover plate. Step polymers cured using temperature or UV can depend on the polymer used to coat the sorbent 305. These polymers can also be deposited on target structures using various thermal spray coating processes, such as, plasma spray (atmospheric and/or vacuum), cold spray, or high-velocity oxyacetylene.

The hydrogen sulfide gas 320 can be generated from at least one component of the battery. The component of the battery can include a sulfur-containing solid electrolyte or a sulfur-containing cathode. For example, the component of the battery can include an electrolyte (e.g., solid-state elec-trolyte, electrolyte layer 260). The hydrogen sulfide gas 320 can be generated from a reaction between the component of the battery and water. The hydrogen sulfide gas 320 can be produced as a byproduct of the operation of the electric vehicle 105. The hydrogen sulfide gas 320 can be produced by the electric vehicle 105. The hydrogen sulfide gas 320 can be released from a component of the battery. The hydrogen sulfide gas 320 can be produced from a lead acid battery. For example, the hydrogen sulfide gas 320 can be produced from overcharging the lead acid battery. The hydrogen sulfide gas 320 can be produced through a solid state electrolyte inter-action with ambient humidity (e.g., water vapor surrounding the battery).

The hydrogen sulfide gas 320 can be generated by a reaction between $H_2O$ and one or more sulfide-containing species. For example, the hydrogen sulfide gas 320 can be generated by a reaction between $H_2O$ and one or more sulfide-containing species (e.g., sulfide-containing solid-state electrolyte, sulfide-containing cathode materials) from the battery. The sulfide-containing species can include lithium sulfide ($Li_2S$), crystalline sulfur, amorphous sulfur, cyclo-sulfur, or sulfur composites. The sulfide-containing species can include a sulfur-containing cathode active mate-rial (CAM), a fully lithiated state of sulfur (e.g., $Li_2S$), $Li_2S$ nanoparticle, $Li_2S$ blended or encapsulated with an elec-tronically conductive matrix (e.g., carbon, graphene, carbon nanotube, etc.), $Li_2S$ blended or encapsulated with an ioni-cally conductive matrix (e.g., transition metal phosphides such as $Fe_2P$, $Co_2P$, or $Ni_2P$), nano-$Li_2S$ graphene aerogel, $Li_2S$ on $Ni_3S_2$, $SnS_2$, $FeS$, $CoS_2$, $VS_2$, or $TiS_2$. Sulfur-containing cathode active materials can be admixed with high surface area carbons and a binder. The hydrogen sulfide gas 320 can be generated by a reaction between $H_2O$ in air and one or more sulfide-containing species from the battery. The hydrogen sulfide gas 320 can be generated by a reaction between ambient humidity and one or more sulfide-contain-ing species from the battery. The hydrogen sulfide gas 320 can be generated by a reaction between $H_2O$ and one or more molecules from the battery. The hydrogen sulfide gas 320 can be generated by a reaction between $H_2O$ and a sulfur-containing solid electrolyte. The hydrogen sulfide gas 320 can be generated by a reaction between $H_2O$ and a sulfur-containing cathode. The hydrogen sulfide gas 320 can be generated by a sulfur-containing cathode active material.

The apparatus 300 can include at least one electric vehicle battery pack (e.g., battery pack 110). The electric vehicle battery pack can include the battery (e.g., battery cell 120, etc.). The apparatus 300 can include at least one cross member 315 (e.g., cross beam). For example, the electric vehicle battery pack can include the cross member 315. The cross member 315 can be coupled with a first side of the electric vehicle battery pack. The cross member 315 can be coupled with a second side of the electric vehicle battery pack. A first cross member 315 can be coupled with the first side of the electric vehicle battery pack. A second cross member 315 can be coupled with the second side of the electric vehicle battery pack. The cross member 315 can be disposed in the housing 205. The sorbent 305 can coat the battery pack 110, the battery cell 120, or the cross member 315. The sorbent 305 can coat the first side of the electric vehicle battery pack or the second side of the electric vehicle battery pack. The sorbent 305 can partially coat the first side of the electric vehicle battery pack or the second side of the electric vehicle battery pack.

The apparatus 300 can include at least one battery pack frame 310. The battery pack frame 310 can be coupled with the cross member 315. For example, the battery pack frame 310 can be coupled with the first cross member 315 or the second cross member 315. The battery pack frame 310 can be coupled with the electric vehicle battery pack. The battery pack frame 310 can be coupled with the first side of the electric vehicle battery pack. The battery pack frame 310 can be coupled with the second side of the electric vehicle battery pack. The battery pack frame 310 can be disposed in the housing 205. The sorbent 305 can coat the battery pack frame 310, the cross member 315, the first side of the electric vehicle battery pack, or the second side of the electric vehicle pack.

The apparatus 300 can include at least one vehicle com-ponent. For example, the vehicle component can include the battery pack frame 310, the battery pack 110, a battery pack cover plate, or the cross member 315. The sorbent 305 can coat the vehicle component. For example, the sorbent 305 can coat the battery pack frame 310, the battery pack 110, the battery pack cover plate, the cross member 315, or the housing 205. The sorbent 305 can coat a surface of at least one of the cross member 315, the first side of the electric vehicle battery pack, or the second side of the electric vehicle battery pack. The sorbent 305 can partially coat the vehicle component. The sorbent 305 can partially coat the cross member 315, the first side of the electric vehicle battery pack, or the second side of the electric vehicle battery pack.

Figure 4:
FIG. 4 depicts a perspective view of an apparatus, according to an example implementation.
Figure 4:
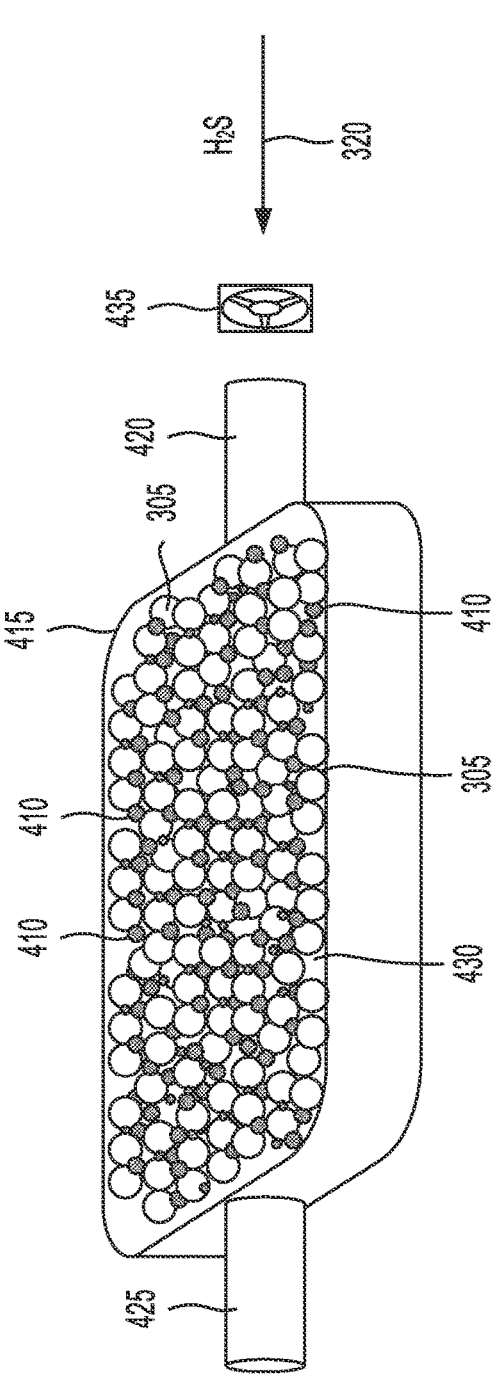

FIG. 4 depicts a perspective view of the apparatus 300. The apparatus 300 can include at least one cartridge 415. The cartridge 415 can be of any shape and dimension. For example, the apparatus 300 can be rectangular, square, or polygonal, among others. The cartridge 415 can include a plate and frame structure. The cartridge 415 can include a sponge (e.g., porous structure). The cartridge 415 can be filled with the sorbent 305. At least a portion of the cartridge 415 can include the sorbent 305. For example, the sorbent 305 can occupy a volume of the cartridge 415. For example, the cartridge 415 can be filled with 5% sorbent 305, 10% sorbent 305, 15% sorbent 305, 20% sorbent 305, 25% sorbent 305, 30% sorbent 305, 35% sorbent 305, 40% sorbent 305, 45% sorbent 305, 50% sorbent 305, 55% sorbent 305, 60% sorbent 305, 65% sorbent 305, 70% sorbent 305, 75% sorbent 305, 80% sorbent 305, 85% sorbent 305, 90% sorbent 305, 95% sorbent 305, or 100% sorbent 305. The cartridge 415 can include different kinds of sorbents 305. The sorbent 305 can include a powder, pellet, solid, or liquid. The sorbent 305 can have a variety of form factors, shapes, or sizes. For example, the sorbent 305 can be on the order of several centimeters (e.g., 2 cm, 3 cm, 4 cm, 5 cm, 10 cm, 15 cm, etc.). The porosity and dimensions of the pellet containing the sorbent 305 can determine diffusion of the hydrogen sulfide gas 320. The cartridge 415 can include walls that surround the sorbent 305. The cartridge 415 can include a body. The body can contain the sorbent 305. The cartridge 415 can be disposed in the electric vehicle 105. The electric vehicle 105 can include one or more cartridges 415. The cartridges 415 can be replaceable. The cartridge 415 can be positioned inside or outside of the battery pack 110. The cartridge 415 can be disposed between the cross member 315 and the battery module 115. Two or more cartridges 415 can be disposed in series.

The cartridge 415 can include at least one inlet 420. The inlet 420 can be fluidly coupled with the body of the cartridge 415. The hydrogen sulfide gas 320 can flow through the inlet 420 into the body of the cartridge 415. The inlet 420 can be coupled with a vehicle component. The sorbent 305 can coat the inlet 420. For example, the sorbent 305 can coat an interior surface or an exterior surface of the inlet 420. The sorbent 305 can partially coat the inlet 420. The hydrogen sulfide gas 320 can be disposed in the inlet 420.

The cartridge 415 can include at least one outlet 425. The outlet 425 can be fluidly coupled with the body of the cartridge 415. Air that is free of hydrogen sulfide gas 320 can flow through the outlet 425 from the body of the cartridge 415. The outlet 425 can be coupled with a vehicle component. The sorbent 305 can coat the outlet 425. For example, the sorbent 305 can coat an interior surface or an exterior surface of the outlet 425. The sorbent 305 can partially coat the outlet 425. The outlet 425 can be fluidly coupled with the inlet 420 to define the fluid pathway 430 through the cartridge 415. The fluid pathway 430 can include the body of the cartridge 415. The sorbent 305 can be disposed in the fluid pathway 430. The sorbent 305 can be disposed in the fluid pathway 430 to interact with the hydrogen sulfide gas 320.

The sorbent 305 can be disposed in the cartridge 415. For example, the sorbent 305 can be disposed in the cartridge 415 to interact with the hydrogen sulfide gas 320. The hydrogen sulfide gas 320 can be disposed in the fluid pathway 430. The sorbent 305 can be disposed in the cartridge 415 to interact with the hydrogen sulfide gas 320 from the fluid pathway 430. The sorbent 305 can interact with the hydrogen sulfide gas 320 in or from the fluid pathway 430. The sorbent 305 can be disposed in the cartridge 415 to interact with the hydrogen sulfide gas 320 from the inlet 420 or the outlet 425. The sorbent 305 can interact with the hydrogen sulfide gas 320 from the inlet 420 or the outlet 425. The sorbent 305 can be packed in the cartridge 415.

The apparatus 300 can include at least one fan 435 (e.g., blades, rotating blades, blower, etc.). The fan 435 can be fluidly coupled with the inlet 420. For example, the fan 435 can be disposed in the inlet 420. The fan 435 can be attached to the inlet 420. The fan 435 can flow the hydrogen sulfide gas 320 to the sorbent 305 disposed in the cartridge 415. The fan 435 can be fluidly coupled with the outlet 425. For example, the fan 435 can be disposed in the outlet 425. The fan 435 can draw air through the body of the cartridge 415. The fan 435 can draw air containing hydrogen sulfide gas 320 to the sorbent 305 disposed in the cartridge 415. An air stream containing hydrogen sulfide gas 320 can be forced into the cartridge 415 by the fan 435. The hydrogen sulfide gas 320 can contact the sorbent 305. For example, the hydrogen sulfide gas 320 can contact powder or pellets that contain the sorbent 305. The fan 435 can be activated by a H₂S sensor. For example, if the H₂S sensor detects a concentration of hydrogen sulfide gas 320 above a threshold value, the fan 435 can be activated to force air to flow through the cartridge 415.

The apparatus 300 can include at least one filler 410 (e.g., filler material, inert filler, etc.). The filler 410 can be inert to the hydrogen sulfide gas 320. For example, the filler 410 can include an inert filler. The filler 410 can be disposed proximate to the sorbent 305. The filler 410 can contact the sorbent 305. The sorbent 305 and the filler 410 can be packed in the cartridge 415. The sorbent 305 and the filler 410 can be packed in the cartridge 415 such that the sorbent 305 has room to increase in volume. The filler 410 can allow air to flow through the cartridge 415 as the sorbent 305 expands or increases in volume. The filler 410 can include a powder, pellet, solid, or liquid. The filler 410 can be dispersed in the sorbent 305. The filler 410 can have a variety of form factors, shapes, or sizes. The filler 410 can prevent the sorbent 305 from fusing together. The filler 410 can prevent metal sulfide from fusing. The filler 410 can allow the hydrogen gas 320 to diffuse throughout the cartridge 415. The filler 410 can be hydrophobic. The filler 410 can move water (e.g., gaseous water) out of the cartridge 415. The filler 410 can include a metal-organic framework.

Figure 5:
FIG. 5 depicts a perspective view of an apparatus, according to an example implementation.
Figure 5:
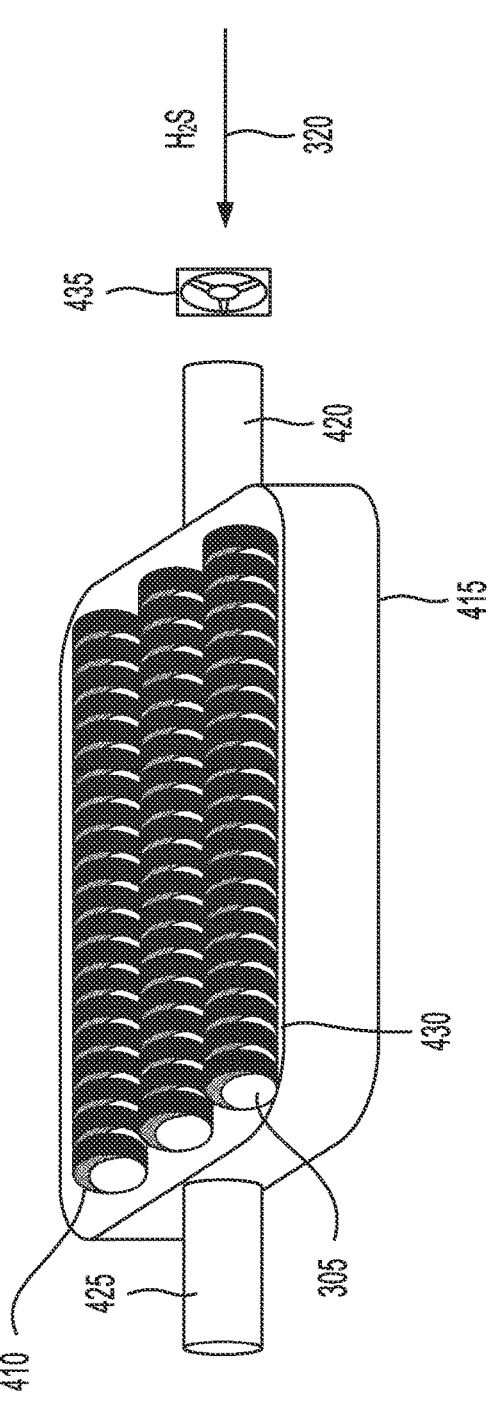

FIG. 5 depicts a perspective view of the apparatus 300. The apparatus 300 can include at least one cartridge 415. The cartridge 415 can be of any shape and dimension. For example, the apparatus 300 can be rectangular, square, or polygonal, among others. The cartridge 415 can include a plate and frame structure. The cartridge 415 can include a sponge (e.g., porous structure). The cartridge 415 can be filled with the sorbent 305. At least a portion of the cartridge 415 can include the sorbent 305. For example, the sorbent 305 can occupy a volume of the cartridge 415. For example, the cartridge 415 can be filled with 5% sorbent 305, 10% sorbent 305, 15% sorbent 305, 20% sorbent 305, 25% sorbent 305, 30% sorbent 305, 35% sorbent 305, 40% sorbent 305, 45% sorbent 305, 50% sorbent 305, 55% sorbent 305, 60% sorbent 305, 65% sorbent 305, 70% sorbent 305, 75% sorbent 305, 80% sorbent 305, 85% sorbent 305, 90% sorbent 305, 95% sorbent 305, or 100% sorbent 305. The cartridge 415 can include different kinds of sorbents 305. The sorbent 305 can include a powder, pellet, solid, or liquid. The sorbent 305 can have a variety of form factors, shapes, or sizes. For example, the sorbent 305 can be on the order of several centimeters (e.g., 2 cm, 3 cm, 4 cm, 5 cm, 10 cm, 15 cm, etc.). The porosity and dimensions of the pellet containing the sorbent 305 can determine diffusion of the hydrogen sulfide gas 320. The cartridge 415 can include walls that surround the sorbent 305. The cartridge 415 can include a body. The body can contain the sorbent 305. The cartridge 415 can be disposed in the electric vehicle 105. The electric vehicle 105 can include one or more cartridges 415. The cartridges 415 can be replaceable. The cartridge 415 can be positioned inside or outside of the battery pack 110. The cartridge 415 can be disposed between the cross member 315 and the battery module 115. Two or more cartridges 415 can be disposed in series.

The cartridge 415 can include at least one inlet 420. The inlet 420 can be fluidly coupled with the body of the cartridge 415. The hydrogen sulfide gas 320 can flow through the inlet 420 into the body of the cartridge 415. The inlet 420 can be coupled with a vehicle component. The sorbent 305 can coat the inlet 420. For example, the sorbent 305 can coat an interior surface or an exterior surface of the inlet 420. The sorbent 305 can partially coat the inlet 420. The hydrogen sulfide gas 320 can be disposed in the inlet 420.

The cartridge 415 can include at least one outlet 425. The outlet 425 can be fluidly coupled with the body of the cartridge 415. Air that is free of hydrogen sulfide gas 320 can flow through the outlet 425 from the body of the cartridge 415. The outlet 425 can be coupled with a vehicle component. The sorbent 305 can coat the outlet 425. For example, the sorbent 305 can coat an interior surface or an exterior surface of the outlet 425. The sorbent 305 can partially coat the outlet 425. The outlet 425 can be fluidly coupled with the inlet 420 to define at least one fluid pathway 430 through the cartridge 415. The fluid pathway 430 can include the body of the cartridge 415. The sorbent 305 can be disposed in the fluid pathway 430. The sorbent 305 can be disposed in the fluid pathway 430 to interact with the hydrogen sulfide gas 320.

The sorbent 305 can be disposed in the cartridge 415. For example, the sorbent 305 can be disposed in the cartridge 415 to interact with the hydrogen sulfide gas 320. The hydrogen sulfide gas 320 can be disposed in the fluid pathway 430. The sorbent 305 can be disposed in the cartridge 415 to interact with the hydrogen sulfide gas 320 from the fluid pathway 430. The sorbent 305 can interact with the hydrogen sulfide gas 320 in or from the fluid pathway 430. The sorbent 305 can be disposed in the cartridge 415 to interact with the hydrogen sulfide gas 320 from the inlet 420 or the outlet 425. The sorbent 305 can interact with the hydrogen sulfide gas 320 from the inlet 420 or the outlet 425. The sorbent 305 can be packed in the cartridge 415.

The apparatus 300 can include at least one fan 435 (e.g., blades, rotating blades, blower, etc.). The fan 435 can be fluidly coupled with the inlet 420. For example, the fan 435 can be disposed in the inlet 420. The fan 435 can be attached to the inlet 420. The fan 435 can flow the hydrogen sulfide gas 320 to the sorbent 305 disposed in the cartridge 415. The fan 435 can be fluidly coupled with the outlet 425. For example, the fan 435 can be disposed in the outlet 425. The fan 435 can draw air through the body of the cartridge 415. The fan 435 can draw air containing hydrogen sulfide gas 320 to the sorbent 305 disposed in the cartridge 415. An air stream containing hydrogen sulfide gas 320 can be forced into the cartridge 415 by the fan 435. The hydrogen sulfide gas 320 can contact the sorbent 305. For example, the hydrogen sulfide gas 320 can contact powder or pellets that contain the sorbent 305. The fan 435 can be activated by a $H_2S$ sensor. For example, if the $H_2S$ sensor detects a concentration of hydrogen sulfide gas 320 above a threshold value, the fan 435 can be activated to force air to flow through the cartridge 415.

The apparatus 300 can include at least one filler 410 (e.g., filler material). The filler 410 can be inert to the hydrogen sulfide gas 320. For example, the filler 410 can include an inert filler. The filler 410 can be disposed proximate to the sorbent 305. The filler 410 can contact the sorbent 305. The sorbent 305 and the filler 410 can be packed in the cartridge 415. The sorbent 305 and the filler 410 can be packed in the cartridge 415 such that the sorbent 305 has room to increase in volume. The filler 410 can allow air to flow through the cartridge 415 as the sorbent 305 expands or increases in volume. The filler 410 can include a powder, pellet, solid, or liquid. The filler 410 can be dispersed in the sorbent 305. The filler 410 can have a variety of form factors, shapes, or sizes. The filler 410 can prevent the sorbent 305 from fusing together. The filler 410 can prevent metal sulfide from fusing. The filler 410 can allow the hydrogen gas 320 to diffuse throughout the cartridge 415. The filler 410 can be hydrophobic. The filler 410 can move water (e.g., gaseous water) out of the cartridge 415. The filler 410 can include a metal-organic framework.

The apparatus 300 can include a plurality of plates. The sorbent 305 can coat the plurality of plates. For example, the sorbent 305 can coat one or more plates. The sorbent 305 can partially coat one or more plates. The sorbent 305 can coat one or more sides of each of the plates. The plurality of plates can receive the hydrogen sulfide gas 320. The plurality of plates can be stacked. For example, the plurality of plates can be disposed in series. Each of the plurality of plates can be separated by a distance. The sorbent 305 can be exposed to the air. The plurality of plates can be exposed to the air, as opposed to enclosed by housing. The hydrogen sulfide gas 320 can flow between the plurality of plates. For example, the hydrogen sulfide gas 320 can flow between two adjacent plates of the plurality of plates.

The apparatus 300 can include a device disposed in the electric vehicle 105. The device can disperse the sorbent 305. For example, the device can include a sprinkler that sprays the sorbent 305. The apparatus 300 can include a liquid. The liquid can include the sorbent 305. The liquid can receive the hydrogen sulfide gas 320. The sorbent 305 can include a solution. For example, the sorbent 305 can include a solution of metal chloride (e.g., ferric chloride).

Figure 6:
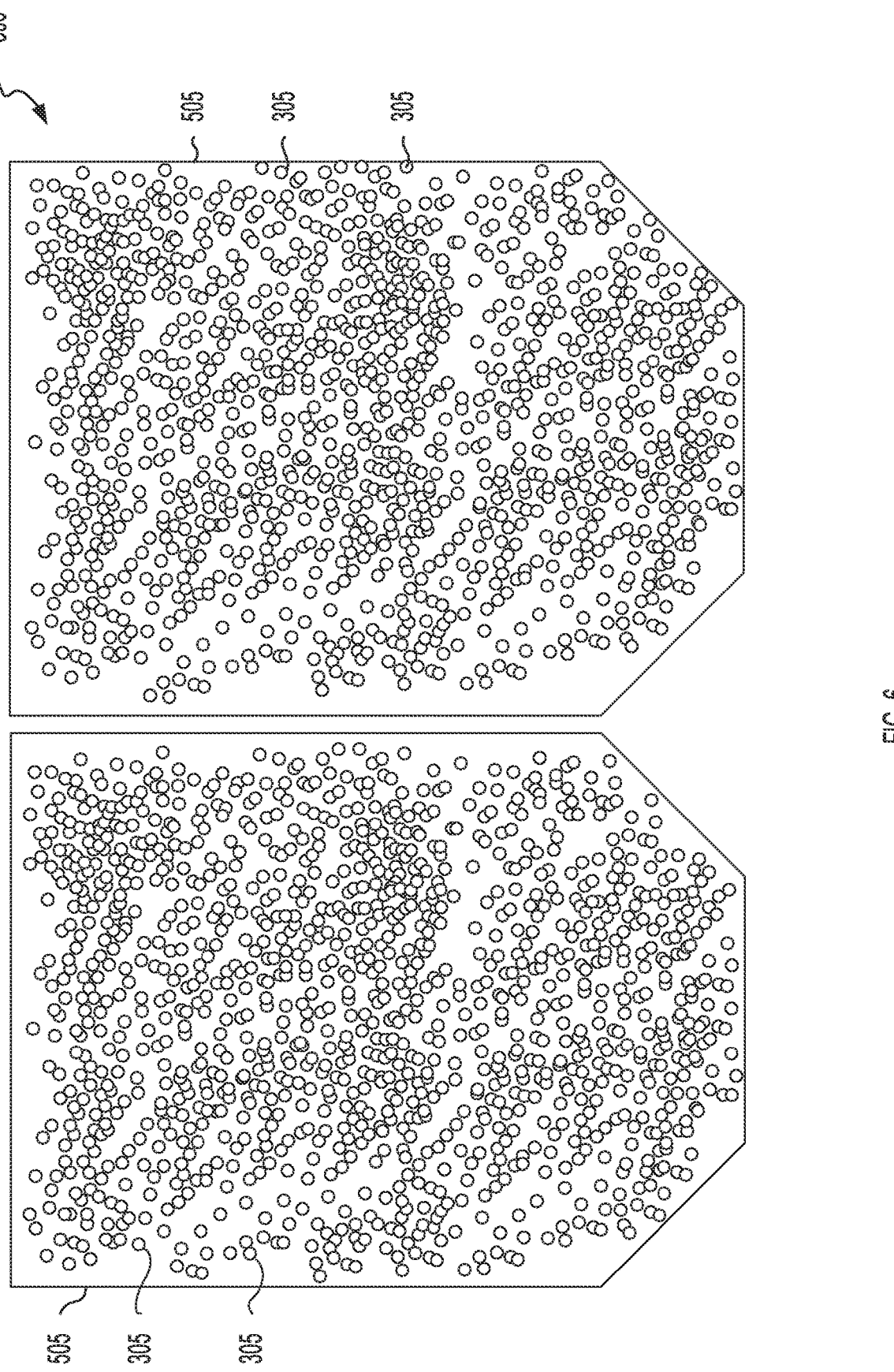
FIG. 6 depicts an overhead view of an apparatus, according to an example implementation.

FIG. 6 depicts an overhead view of the apparatus 300. The apparatus 300 can include a battery pack cover plate 505 (e.g., top cover plate, bottom cover plate). The cover plate 505 can be coated with the sorbent 305. The sorbent 305 can be disposed on the cover plate 505. The sorbent 305 can be disposed on the top cover plate or the bottom cover plate. The sorbent 305 can be disposed on a first surface of the top cover plate or a second surface of the cover plate 505. The sorbent 305 can be evenly or unevenly distributed over a portion of the cover plate 505. The cover plate 505 can be of any shape and dimension. For example, the cover plate 505 can be rectangular, square, or polygonal, among others. The sorbent 305 can partially coat the cover plate 505.

Figure 7:
FIG. 7 depicts a method of abating $H_2S$ gas, according to an example implementation.
Figure 7:
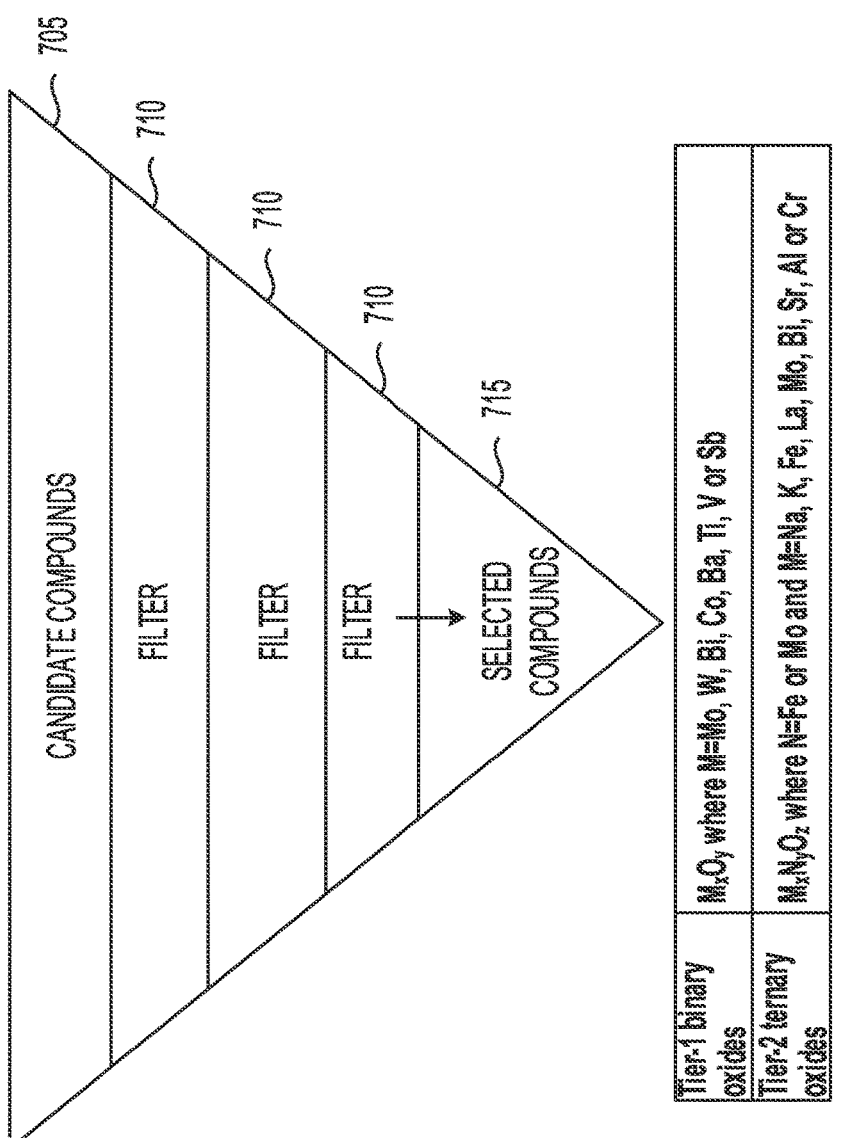

FIG. 7 depicts a method 700 of abating $H_2S$ gas. The method 700 can include dividing a set of candidate compounds 705 into a first set of compounds and a second set of compounds. For example, a filter 710 can be applied to separate the second set of compounds from the first set of compounds. The filter 710 can be applied to select the second set of compounds from the set of candidate compounds. The set of candidate compounds 705 can include greater than 26,000 compounds (e.g., binary and ternary oxide compounds). Density functional theory (DFT) calculated properties can be used to divide (e.g., screen) the compounds. The first set of compounds can include one or more elements that are radioactive. For example, the one or more elements that are radioactive can include technetium, promethium, polonium, astatine, radon, francium, radium, actinium, thorium, protactinium, uranium, neptunium, plutonium, americium, curium, berkelium, californium, einsteinium, fermium, mendelevium, nobelium, lawrencium, rutherfordium, dubnium, seaborgium, bohrium, hassium, meitnerium, darmstadtium, roentgenium, copernicium, nihonium, flerovium, moscovium, livermorium, tennessine, or oganesson.

The first set of compounds can include one or more elements that have an abundance below an abundance threshold. For example, the abundance can include the abundance of the element in the upper continental crust of the Earth. The one or more elements that have an abundance below an abundance threshold can include ruthenium, rhodium, palladium, tellurium, rhenium, osmium, iridium, platinum, or gold. The one or more elements that have an abundance below an abundance threshold can include rare elements. The first set of compounds can include one or more elements that have a parameter above a parameter threshold. For example, the parameter can include cost and the parameter threshold can include a cost threshold.

The second set of compounds can include a remainder of the set of candidate compounds 705. For example, the second set of compounds can include the set of candidate compounds 705 that do not include the first set of compounds. The second set of candidate compounds 705 can include compounds with elements that are not radioactive. The second set of candidate compounds 705 can include compounds with elements that have an abundance above the abundance threshold. The second set of candidate compounds 705 can include compounds with elements that have a parameter below the parameter threshold. For example, the second set of candidate compounds 705 can include compounds with elements that have a cost below the cost threshold.

The method 700 can include selecting a third set of compounds from the second set of compounds. For example, the filter 710 can be applied to select the third set of compounds from the second set of compounds. The third set of compounds can include compounds that have thermodynamic stability above a stability threshold. For example, the stability threshold can include thermodynamic stability at OK. The thermodynamic stability can be quantified based on the energy of the compound above the convex hull (Ehull) in the chemical space of elements which make up the compound. A compound with Ehull=0 can lie in the energy convex hull and is a thermodynamically stable phase at OK. A compound with Ehull>0 can be thermodynamically metastable. A compound with a high energy above hull (e.g., Ehull>50 meV/atom) may have a strong driving force to decomposition and may be difficult to synthesize experimentally.

The method 700 can include selecting a fourth set of compounds from the third set of compounds. For example, the filter 710 can be applied to select the fourth set of compounds from the fourth set of compounds. The fourth set of compounds can include compounds that have reactivity with hydrogen sulfide gas above a reactivity threshold. For example, the reactivity threshold can include reactivity with hydrogen sulfide gas better than $Fe_2O_3$. The fourth set of compounds can included selected compounds 715. The fourth set of compounds can include compounds that absorb or adsorb hydrogen sulfide gas. The fourth set of compounds can include 10-30 compounds (e.g., binary and ternary oxide compounds). The filters 710 can be applied to select the fourth set of compounds from the set of candidate compounds. The number of compounds in the fourth set of compounds can be three orders of magnitude smaller than the number of compounds in the set of candidate compounds.

The fourth set of compounds includes at least one of a binary metal oxide compound (e.g., $M_xO_y$), a ternary metal oxide compound (e.g., $M_xN_yO_z$), or a combination thereof. For example, the fourth set of compounds can include at least one of $Mo_9O_{26}$, $W_{18}O_{49}$, $W_8O_{21}$, $Bi_4O_7$, $Co_3O_4$, $BaO_{10}$, $Ti_6O$, $V_5O_{12}$, $Sb_2O_5$, $Na_6Mo_{11}O_{36}$, $K_{14}Fe_4O_{13}$, $La_6Mo_8O_{33}$, $K_2Mo_4O_{13}$, $Fe_2(MoO_4)_3$, $Bi_{14}Mo_5O_{36}$, $K_{17}Fe_5O_{16}$, $Sr_8Fe_8O_{23}$, $Bi_2(MoO_4)_3$, $Al_2(MoO_4)_3$, $Cr_2(MoO_4)_3$, or a combination thereof. The fourth set of compounds can include a compound that has a reactivity with hydrogen sulfide gas 320 greater than the reactivity of $Fe_2O_3$ with hydrogen sulfide gas 320.

Figure 8:
FIG. 8 depicts reactions of structural units of sulfide electrolytes with $H_2O$, according to an example implementation.
Figure 8:
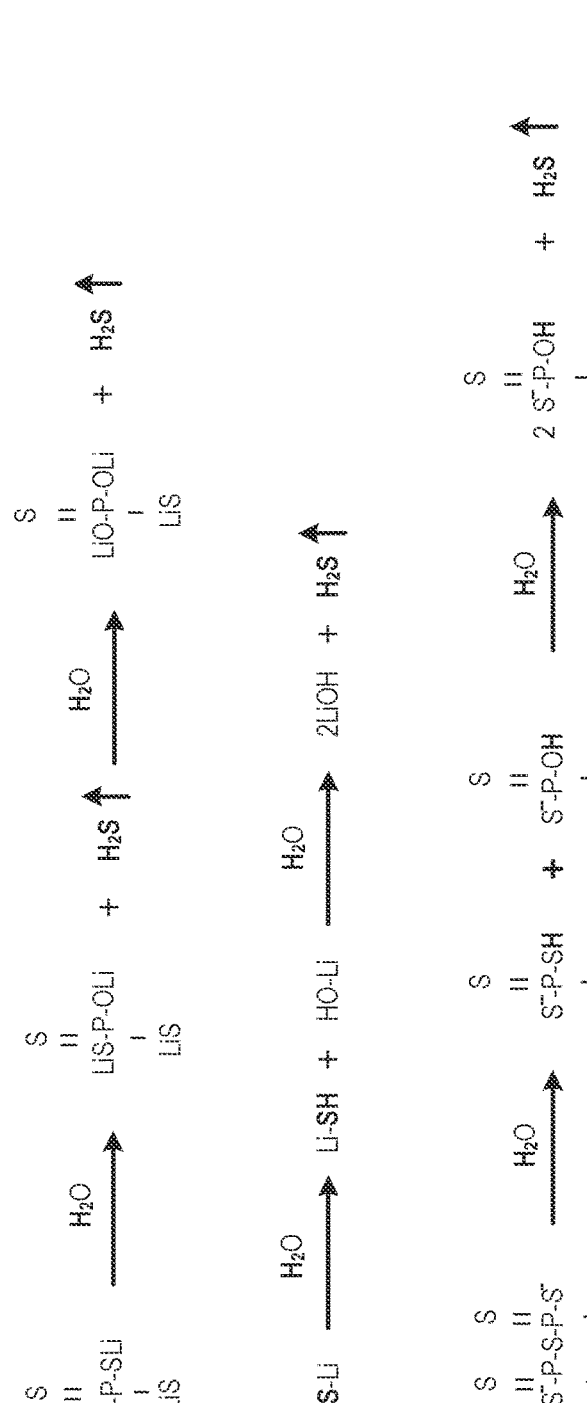

FIG. 8 depicts reactions 800 of structural units of sulfide-containing electrolytes or sulfide-containing cathodes with $H_2O$. The amounts of $H_2S$ generated from a sulfide solid electrolyte or sulfide-containing cathode can depend on the composition of the sulfide, humidity, and temperature. The structural units of sulfide electrolytes, $Li_2S$ and $P_xS_y$, can be highly moisture sensitive and decomposed to OH and SH groups in presence of water, which can release $H_2S$. The hydrogen sulfide gas 320 can be generated by a reaction between $H_2O$ and one or more sulfide-containing species. For example, the hydrogen sulfide gas 320 can be generated by a reaction between $H_2O$ and one or more sulfide-containing species from the battery. The hydrogen sulfide gas 320 can be generated by a reaction between $H_2O$ in air and one or more sulfide-containing species from the battery. The hydrogen sulfide gas 320 can be generated by a reaction between ambient humidity and one or more sulfide-containing species from the battery. The hydrogen sulfide gas 320 can be generated by a reaction between $H_2O$ and one or more molecules from the battery.

Figure 9:
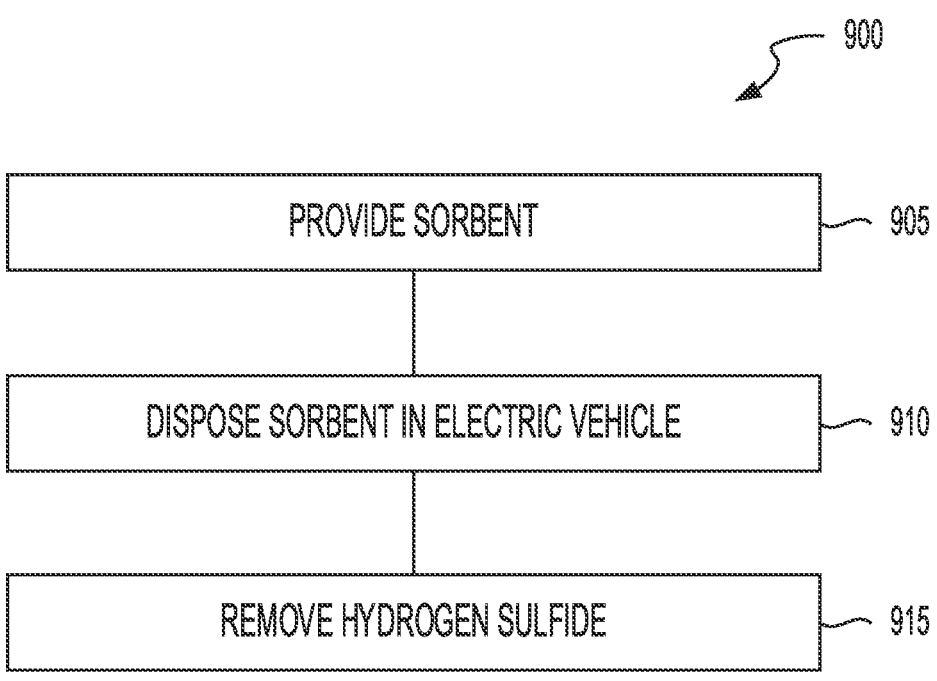
FIG. 9 depicts a method of forming an apparatus, according to an example implementation.

FIG. 9 depicts a method 900 of forming an apparatus. The method 900 can include providing the sorbent (ACT 905). The method 900 can include disposing the sorbent in an electric vehicle (ACT 910). The method 900 can include removing hydrogen sulfide from the electric vehicle (ACT 915). The acts of the method 900 may be interchangeable or removed. Additional acts may be added to the method 900.

The method 900 can include providing the sorbent (ACT 905). The sorbent can include a solid sorbent or a liquid sorbent. The sorbent can have a variety of form factors, shapes, or sizes. The sorbent can include at least one of a metal, a metal oxide, a chloride, a sulfate, or a combination thereof. For example, the sorbent can include at least one of $Mo_9O_{26}$, $W_{18}O_{49}$, $W_8O_{21}$, $Bi_4O_7$, $Co_3O_4$, $BaO_{10}$, $Ti_6O$, $V_5O_{12}$, $Sb_2O_5$, $Na_6Mo_{11}O_{36}$, $K_{14}Fe_4O_{13}$, $La_6Mo_8O_{33}$, $K_2Mo_4O_{13}$, $Fe_2(MoO_4)_3$, $Bi_{14}Mo_5O_{36}$, $K_{17}Fe_5O_{16}$, $Sr_8Fe_8O_{23}$, $Bi_2(MoO_4)_3$, $Al_2(MoO_4)_3$, $Cr_2(MoO_4)_3$, or a combination thereof. The sorbent can include a concentrated solution containing iron chloride or iron sulfate. The sorbent can be used to remove the hydrogen sulfide gas as FeS. The sorbent can include at least one of $FeCl_2$, $FeCl_3$ or $FeSO_4$. The sorbent can include porous inorganic materials. For example, the sorbent can include porous inorganic materials with oxidative properties. The sorbent can include metal nanoparticles. The sorbent can include metal nanoparticles embedded on carbon. The sorbent can include metal oxide nanoparticles. The sorbent can include activated carbon. The sorbent can include activated carbon impregnated with metal nanoparticles. The sorbent can include biochar. The sorbent can include biochar obtained from waste materials. The sorbent can include a powder, pellet, solid, or liquid.

The method 900 can include disposing the sorbent in an electric vehicle (ACT 910). The sorbent can be disposed in the electric vehicle. The electric vehicle can include at least one battery (e.g., battery cell, battery pack, etc.). For example, the battery can be disposed in the electric vehicle. The battery can include a sulfide solid electrolyte. For example, the battery can include the sulfide solid electrolyte disposed in the electric vehicle. Sulfide solid electrolytes can have chemical instability in air. For example, the $PS_4^{3-}$ group can react with the humidity in the air (e.g., ambient humidity) and release corrosive $H_2S$ gas. The battery can include a sulfide-based solid electrolyte. For example, the battery can include the sulfide-based solid electrolyte disposed in the electric vehicle. The battery can include a sulfur-containing solid electrolyte. For example, the battery can include the sulfur-containing solid electrolyte disposed in the electric vehicle. The battery can include a lead acid battery with a liquid sulfuric acid electrolyte.

The method 900 can include removing hydrogen sulfide from the electric vehicle (ACT 915). The sorbent can remove hydrogen sulfide gas (e.g., $H_2S$ gas) from the electric vehicle 105. For example, the sorbent can react with the hydrogen sulfide gas to consume the hydrogen sulfide gas. The sorbent can remove the hydrogen sulfide gas by chemically reacting with the hydrogen sulfide gas. The sorbent can react with ambient humidity or water vapor in the air. The sorbent can react with the hydrogen sulfide gas to remove the hydrogen sulfide gas from the electric vehicle. For example, the sorbent can remove the hydrogen sulfide gas from an area inside or surrounding the electric vehicle. The sorbent can remove hydrogen sulfide gas from the air. The hydrogen sulfide gas can be removed by precipitation. For example, the hydrogen sulfide gas can be removed by precipitation using a concentrated solution. The sorbent can capture the hydrogen sulfide gas. For example, the sorbent can absorb or adsorb the hydrogen sulfide gas. The sorbent can remove hydrogen sulfide from the electric vehicle by trapping the hydrogen sulfide gas on in the bulk of the sorbent or a surface of the sorbent. The hydrogen sulfide gas can be released in the battery pack 110 if there is a mechanical failure or cell (e.g., battery cell 120) failure. For example, an improper seal can let moisture (e.g., $H_2O$, water, etc.) into the battery pack 110. The battery cell 120 can be punctured, resulting in moisture entering the battery cell 120 and reacting with the electrolyte to produce hydrogen sulfide gas 320. Moisture can be trapped in the battery cell 120 from an undried component of the battery cell 120, which can lead to battery cell failure. Hydrogen sulfide gas can corrode metal components in the battery pack 110. Hydrogen sulfide gas can corrode structural members of the battery pack 110. The sorbent can prevent the hydrogen sulfide gas from entering the cabin of the electric vehicle.

Figure 10:
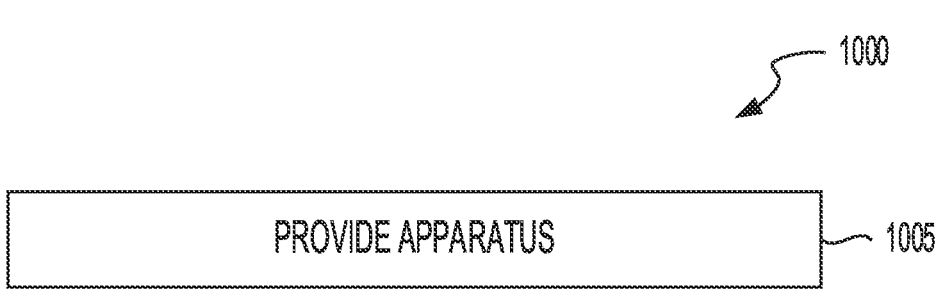
FIG. 10 depicts a method of providing a sorbent, according to an example implementation.

FIG. 10 depicts a method 1000 of providing a sorbent. The method 1000 can include providing the sorbent (1005). The sorbent can include a solid sorbent or a liquid sorbent. The sorbent can have a variety of form factors, shapes, or sizes. The sorbent can include at least one of a metal, a metal oxide, a chloride, or a sulfate. For example, the sorbent can include at least one of $Mo_9O_{26}$, $W_{18}O_{49}$, $W_8O_{21}$, $Bi_4O_7$, $Co_3O_4$, $BaO_{10}$, $Ti_6O$, $V_5O_{12}$, $Sb_2O_5$, $Na_6Mo_{11}O_{36}$, $K_{14}Fe_4O_{13}$, $La_6Mo_8O_{33}$, $K_2Mo_4O_{13}$, $Fe_2(MoO_4)_3$, $Bi_{14}Mo_5O_{36}$, $K_{17}Fe_5O_{16}$, $Sr_8Fe_8O_{23}$, $Bi_2(MoO_4)_3$, $Al_2(MoO_4)_3$, or $Cr_2(MoO_4)_3$. The sorbent can include a concentrated solution containing iron chloride or iron sulfate. The sorbent can be used to remove the hydrogen sulfide gas as FeS. The sorbent can include at least one of $FeCl_2$, $FeCl_3$ or $FeSO_4$. The sorbent can include porous inorganic materials. For example, the sorbent can include porous inorganic materials with oxidative properties. The sorbent can include metal nanoparticles. The sorbent can include metal nanoparticles embedded on carbon. The sorbent can include metal oxide nanoparticles. The sorbent can include activated carbon. The sorbent can include activated carbon impregnated with metal nanoparticles. The sorbent can include biochar. The sorbent can include biochar obtained from waste materials. The sorbent can include a powder, pellet, solid, or liquid.

While operations are depicted in the drawings in a particular order, such operations are not required to be performed in the particular order shown or in sequential order, and all illustrated operations are not required to be performed. Actions described herein can be performed in a different order. The steps of a method may be interchangeable in the process. The steps of the method may be removed from the process. Other steps may be added to the method.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a cartridge to be disposed in an electric vehicle, the cartridge comprising an inlet configured to receive hydrogen sulfide gas, the electric vehicle comprising a battery cell;
a sorbent comprising metal nanoparticles embedded on carbon, the sorbent disposed in the cartridge and configured to remove hydrogen sulfide gas from the electric vehicle, the hydrogen sulfide gas generated from a component of the battery cell; and
a filler inert to the hydrogen sulfide gas and disposed in the cartridge, the filler comprising a powder dispersed throughout the sorbent, wherein the filler is hydrophobic and is configured to prevent the sorbent from fusing together.

2. The apparatus of claim 1, comprising:
an electric vehicle battery pack comprising the battery cell;
a cross member coupled with a first side of the electric vehicle battery pack and with a second side of the electric vehicle battery pack; and
the sorbent coated on a surface of at least one of: the cross member, the first side of the electric vehicle battery pack, the second side of the electric vehicle battery pack, or a combination thereof.

3. The apparatus of claim 1, comprising:
the cartridge having an inlet and an outlet, the outlet fluidly coupled with the inlet to define a fluid pathway through the cartridge; and
the sorbent disposed in the cartridge to interact with the hydrogen sulfide gas from the fluid pathway.

4. The apparatus of claim 1, comprising:
a vehicle component; and
the sorbent coated on the vehicle component.

5. The apparatus of claim 1, comprising:
the cartridge comprising an inlet; and
a fan fluidly coupled with the inlet and configured to flow the hydrogen sulfide gas to the sorbent disposed in the cartridge.

6. The apparatus of claim 1, comprising:
the filler disposed proximate to the sorbent.

7. The apparatus of claim 1, comprising:
a liquid comprising the sorbent and configured to receive the hydrogen sulfide gas.

8. The apparatus of claim 1, comprising:
the sorbent configured to react with the hydrogen sulfide gas.

9. The apparatus of claim 1, comprising:
the sorbent configured to capture the hydrogen sulfide gas.

10. The apparatus of claim 1, comprising:
the hydrogen sulfide gas is generated by a reaction between $H_2O$ and one or more sulfide-containing species from the battery cell.

11. The apparatus of claim 1, wherein the sorbent comprises at least one of: a metal, a metal oxide, a chloride, a sulfate, or a combination thereof.

12. The apparatus of claim 1, wherein the sorbent comprises at least one of:
$Mo_9O_{26}$, $W_{18}O_{49}$, $W_8O_{21}$, $Bi_4O_7$, $Co_3O_4$, $BaO_{10}$, $Ti_6O$, $V_5O_{12}$, $Sb_2O_5$, $Na_6Mo_{11}O_{36}$, $K_{14}Fe_4O_{13}$, $La_6Mo_8O_{33}$, $K_2Mo_4O_{13}$, $Fe_2(MoO_4)_3$, $Bi_{14}Mo_5O_{36}$, $K_{17}Fe_5O_{16}$, $Sr_8Fe_8O_{23}$, $Bi_2(MoO_4)_3$, $Al_2(MoO_4)3$, $Cr_2(MoO_4)_3$, or a combination thereof.

13. The apparatus of claim 1, wherein the battery cell comprises at least one of: a sulfide-based solid electrolyte, a sulfur-containing cathode disposed in the electric vehicle, or a combination thereof.

14. The apparatus of claim 1, wherein:
the sorbent comprises a metal oxide; and
a reactivity of the metal oxide with hydrogen sulfide is greater than a reactivity of $Fe_2O_3$ with hydrogen sulfide.

15. The apparatus of claim 1, comprising:
a battery pack cover plate; and
the sorbent coated on the battery pack cover plate and configured to receive the hydrogen sulfide gas.

16. The apparatus of claim 15, wherein the sorbent is distributed evenly over a portion of the battery pack cover plate.

17. The apparatus of claim 15, wherein the sorbent is distributed unevenly over a portion of the battery pack cover plate.

18. The apparatus of claim 1, wherein the sorbent comprises a ternary metal oxide.

19. The apparatus of claim 1, comprising:
the sorbent configured to react with the hydrogen sulfide gas and form metal sulfide; and
the filler configured to prevent the metal sulfide from fusing together.

20. The apparatus of claim 1, comprising:
the cartridge comprising an inlet; and
a fan fluidly coupled with the inlet and configured to flow the hydrogen sulfide gas to the sorbent disposed in the cartridge;
an $H_2S$ sensor configured to activate the fan responsive to detecting a concentration of hydrogen sulfide gas above a threshold value.

* * * * *